(12) United States Patent
Zhou

(10) Patent No.: US 9,632,871 B2
(45) Date of Patent: Apr. 25, 2017

(54) REUSE OF PROBLEMATIC DISKS IN A REDUNDANT DISK SYSTEM

(71) Applicant: International Business Machines Corporation, Armonk, NY (US)

(72) Inventor: Xue Qiang Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 14/642,791

(22) Filed: Mar. 10, 2015

(65) Prior Publication Data

US 2015/0309876 A1    Oct. 29, 2015

(30) Foreign Application Priority Data

Apr. 24, 2014    (CN) .......................... 2014 1 0168641

(51) Int. Cl.
  *G06F 11/00*  (2006.01)
  *G06F 11/10*  (2006.01)

(52) U.S. Cl.
  CPC ...... *G06F 11/1084* (2013.01); *G06F 11/1092* (2013.01)

(58) Field of Classification Search
  USPC ....................................................... 714/6.22
  See application file for complete search history.

(56) References Cited

U.S. PATENT DOCUMENTS

| | | | | |
|---|---|---|---|---|
| 6,233,108 B1 * | 5/2001 | Inoue | ................ | G11B 20/1816 360/48 |
| 6,282,670 B1 * | 8/2001 | Rezaul Islam | ...... | G06F 11/1096 711/114 |
| 6,442,711 B1 * | 8/2002 | Sasamoto | ............. | G06F 11/008 714/38.1 |
| 6,754,770 B2 * | 6/2004 | Kang | .................. | G06F 11/1405 711/114 |
| 6,854,071 B2 * | 2/2005 | King | .................. | G06F 11/0727 369/53.35 |

(Continued)

FOREIGN PATENT DOCUMENTS

EP        2557530 A1    2/2013

OTHER PUBLICATIONS

Klein et al., "Raid Architecture with Correction of Corrupted Data in Faulty Disk Blocks," 2009 22nd International Conference on Architecture of Computing Systems, Mar. 11, 2009, ISBN: 978-3-8007-3133-6.

(Continued)

*Primary Examiner* — Amine Riad
(74) *Attorney, Agent, or Firm* — Nicholas D. Bowman

(57) ABSTRACT

A problematic disk within a Redundant Array of Independent Disks (RAID) data storage system can be reused. A first disk within the RAID data storage system can be formatted, initialized, and validated in response to the first disk experiencing a recoverable data storage error. The first disk can be designated as a second-level redundant disk within the RAID data storage system in order for the RAID data storage system to access the first disk in response to success of the validating operation on the first disk. Problematic disks experiencing media errors and/or slow disk errors can be isolated from the RAID data storage system to ensure high reliability of the RAID system.

18 Claims, 5 Drawing Sheets

(56) References Cited

U.S. PATENT DOCUMENTS

| | | | | |
|---|---|---|---|---|
| 7,275,179 B1* | 9/2007 | Coatney | ............. | G06F 11/1084 |
| | | | | 714/6.32 |
| 7,293,195 B1* | 11/2007 | Watanabe | ........... | G06F 11/2028 |
| | | | | 714/3 |
| 7,373,559 B2 | 5/2008 | Guha | | |
| 7,389,379 B1* | 6/2008 | Goel | ................... | G06F 11/1662 |
| | | | | 711/112 |
| 7,434,090 B2 | 10/2008 | Hartung et al. | | |
| 7,512,736 B1* | 3/2009 | Overby | ................. | G06F 3/0607 |
| | | | | 707/999.202 |
| 7,549,112 B2* | 6/2009 | Terry | ................. | G06F 11/1092 |
| | | | | 714/5.11 |
| 7,661,020 B1* | 2/2010 | Coatney | ............. | G06F 11/1084 |
| | | | | 714/6.32 |
| 7,664,913 B2 | 2/2010 | Cassell et al. | | |
| 7,827,434 B2* | 11/2010 | D'Souza | ............. | G06F 11/1076 |
| | | | | 714/3 |
| 7,917,810 B2* | 3/2011 | Piszczek | .............. | G06F 11/008 |
| | | | | 714/27 |
| 7,971,093 B1* | 6/2011 | Goel | .................... | G06F 11/004 |
| | | | | 714/6.22 |
| 8,099,623 B1 | 1/2012 | Li et al. | | |
| 8,417,989 B2 | 4/2013 | Kumar et al. | | |
| 8,464,090 B2 | 6/2013 | Nagpal et al. | | |
| 9,244,780 B2* | 1/2016 | Singh | .................. | G06F 11/1469 |
| 2003/0080829 A1* | 5/2003 | Lampen | ................... | H03H 7/20 |
| | | | | 333/164 |
| 2003/0188097 A1* | 10/2003 | Holland | .............. | G06F 11/1076 |
| | | | | 711/114 |
| 2004/0181388 A1* | 9/2004 | Yip | ........................ | G06F 3/0607 |
| | | | | 703/25 |
| 2005/0055603 A1* | 3/2005 | Soran | .................... | G06F 3/0608 |
| | | | | 714/6.32 |
| 2007/0067666 A1* | 3/2007 | Ishikawa | ............ | G06F 11/1092 |
| | | | | 714/6.21 |
| 2007/0226413 A1* | 9/2007 | Elliott | ................... | G06F 3/0617 |
| | | | | 711/114 |
| 2008/0077825 A1* | 3/2008 | Bello | .................. | G06F 11/0727 |
| | | | | 714/54 |
| 2010/0037091 A1* | 2/2010 | Baderdinni | ......... | G06F 11/1076 |
| | | | | 714/6.12 |
| 2010/0332893 A1 | 12/2010 | D'Souza et al. | | |
| 2013/0132672 A1* | 5/2013 | Kimura | .................. | G06F 3/0677 |
| | | | | 711/114 |
| 2014/0351632 A1* | 11/2014 | Grube | ................. | G06F 11/1092 |
| | | | | 714/6.24 |

OTHER PUBLICATIONS

Suarez-Castanon et al., "Protecting Data Against Consecutive Disk Failures in RAID-5," 2009 Mexican International Conference on Computer Science, Sep. 21-25, 2009, pp. 353-359 DOI: 10.1109/ENC.2009.56.

CN Application 201410168641.8, Entitled "Reuse of Problematic Disk in RAID System," Filed Apr. 24, 2014.

* cited by examiner

REUSE OF PROBLEMATIC DISKS IN A REDUNDANT DISK SYSTEM

BACKGROUND

The present disclosure relates to data storage, and more specifically, to a system and method for the reuse of a problematic disk within a Redundant Array of Independent Disks (RAID) data storage system.

A RAID data storage system can be used to form a group of hard disks, or a logical hard disk by combining multiple independent physical hard disks or disk drives in various configurations. Such configurations can provide higher data storage performance than can be obtained from a single hard disk. A hard disk group or logical hard disk can also be used to provide backup capability for data. In a RAID data storage system, a backup hard disk can be referred to as a "redundant" disk, and the hard disk for storing data for a computer user can be referred to as a "working" disk. When the working disk encounters a data storage error, which can include a hard disk failure and/or disk "event", it may be isolated from the RAID data storage system, and the RAID data storage system can rebuild data contained on the working disk onto the redundant disk. The working disk can be replaced by the redundant disk.

Working disk errors or events may be classified or described as "hard data storage errors", "media errors" and "slow disk errors". A hard data storage error can result from a serious hardware failure of the disk mechanism itself, such as magnetic head, drive motor, or electronic component failure, through which the disk mechanism may become completely inoperable. These types of errors may be classified or described as "irrecoverable" errors. A media error can include some types of recoverable data storage errors, such as a certain sector of the disk becoming unusable. A backup redundant sector can subsequently be used to store data formerly stored on an unusable disk sector. The term "slow disk errors" can refer to certain data storage errors related to disk software which are not caused by a hardware or recordable media failure. However, the existence of both media errors and slow disk errors may cause a reduction of disk performance, and thus can cause a performance reduction of the entire RAID data storage system. Therefore, in a high-end data storage system, in order to maintain the performance of the data storage system, when the count of media errors and slow disk errors of a working disk reach a certain threshold, that particular working disk can be isolated, i.e.; logically or physically disconnected, or removed from the RAID data storage system.

According to embodiments of the present disclosure, in a high-end storage system, a working disk that is isolated due to media errors and/or slow disk errors can be effectively reused without being placed in a "failure state" to wait for a pending repair action.

SUMMARY

Embodiments may be directed towards a method for reuse of a problematic disk in a Redundant Array of Independent Disks (RAID) system. The method can include performing formatting, initializing and validating operations on a first disk in the RAID system in response to the first disk experiencing a problem and determining that the first disk has not experienced a hard error. The method can also include setting the first disk as a second-level redundant disk in the RAID system in order for the RAID system to use the first disk again in response to success of the validating operation on the first disk.

Embodiments may also be directed towards a system for reuse of a problematic disk within a Redundant Array of Independent Disks (RAID). The system can include a non-transitory computer-readable storage medium having program instructions stored thereon, the program instructions executable by one or more computer processor circuits configured to execute a method. The method can include performing, in response to a first disk within the RAID data storage system experiencing a recoverable data storage error, formatting, initializing and validating operations on the first disk. The method can also include, designating, in response to success of the validating operation on the first disk, the first disk within the RAID data storage system as a second-level redundant disk and accessing the first disk.

According to embodiments of the present disclosure, problematic disks can be isolated from the RAID data storage system in response to media errors or slow disk errors. In some embodiments, isolation of such problematic disks can ensure a high level of reliability of the RAID data storage system.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Through the more detailed description of some embodiments of the present disclosure in the accompanying drawings, the above and other objects, features and advantages of the present disclosure will become more apparent, wherein the same reference generally refers to the same components in the embodiments of the present disclosure.

Figure 1:
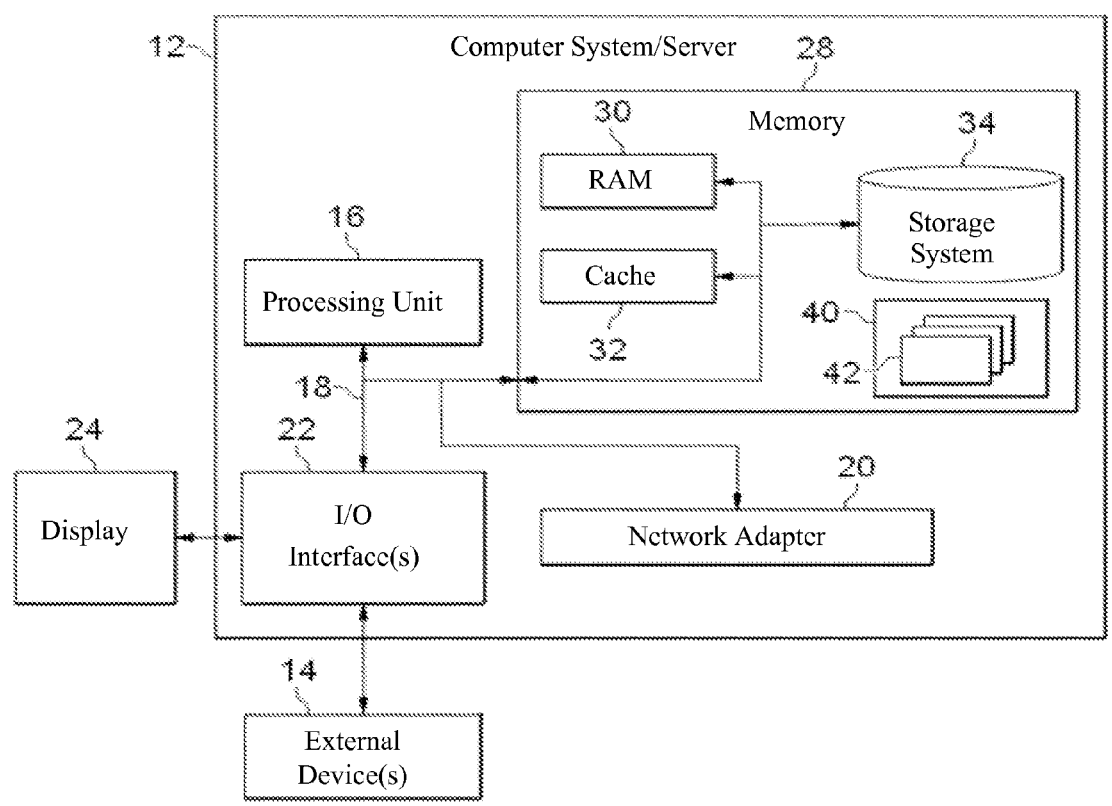
FIG. 1 shows an exemplary computer system/server which can be used to implement the embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

The present disclosure may be a system, a method, and/or a computer program product. The computer program product may include a computer readable storage medium (or media) having computer readable program instructions thereon for causing a processor to carry out aspects of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

FIG. 1 depicts an exemplary computer system/server 12 which is applicable to implement the embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 can include a variety of computer system readable media. Such media may be any available media that is accessible by computer system/server 12, including both volatile and non-volatile media, removable and non-removable media.

System memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc., one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Computer system/server 12 can also communicate with one or more networks such as a local area network (LAN), a general wide area network (WAN), and/or a public network (e.g., the Internet) via network adapter 20. As depicted, network adapter 20 can communicate with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, Redundant Array of Independent Disks (RAID) data storage systems, tape drives, and data archival storage systems, etc.

According to disk usage statistics collected over an extended time, over 95% of the problematic disks in high-end storage systems can be isolated out of the system due to media errors or slow disk errors. According to embodiments of the present disclosure, those problematic disks can be reused by the RAID data storage system.

Figure 2:
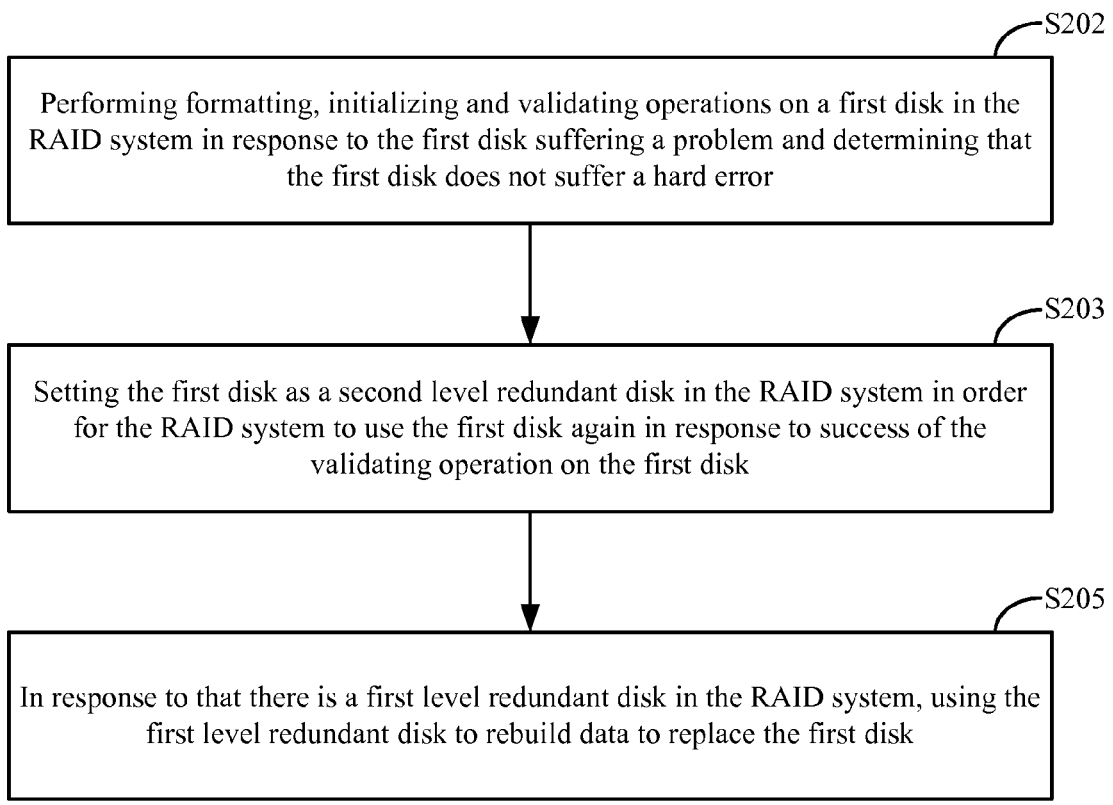
FIG. 2 is a flowchart depicting a method for reuse of a problematic disk within a Redundant Array of Independent Disks (RAID) data storage system.

According to some embodiments of the present disclosure, a method is disclosed for the reuse of a problematic disk within a RAID data storage system. FIG. 2 depicts a flowchart of the method for reuse of a problematic disk within a RAID data storage system. According to FIG. 2, the method includes operation S202 for performing formatting, initializing and validating operations on a first disk within the RAID data storage system in response to the first disk experiencing a data storage error and determining that the first disk has not experienced a hard error. The method also includes operation S203 which involves designating the first disk as a second-level redundant disk within the RAID data storage system in order for the RAID data storage system to use the first disk again in response to success of the validating operation on the first disk.

If the first disk is experiences a data storage error that does not include a hard error, the disk may experience media errors or slow disk error(s). In this case, the experienced data storage error refers to a an error that could result in the disk is to be isolated (in the prior art) such as a hardware-related data storage error. In such a case, the count of errors can exceed a defined error count threshold. A solution may include performing the formatting, initializing and validating operations on the first disk. The formatting may be performed to ensure the success of each writing operation by filling each sector of the disk with logical "0"s. The initializing operation may refer to performing some disk configurations to adapt the disk for storage system usage. The validating operation can include reading each sector of the disk, and if each reading operation succeeds, the validation succeeds; if any reading operation fails, the validation operation fails. The disk with successful validation can be regarded as healthy and suitable for re-use within the RAID data storage system.

In certain applications, the redundant disks within the RAID data storage system are not classified at different levels. In the present disclosure, although the first disk can be validated as healthy and suitable for use within the RAID data storage system, it may have experienced a data storage error, and it cannot be used equivalently with the redundant disks without any system configuration problems. Therefore, in embodiments of the present disclosure, the redundant disk that is configured within the RAID system, without any data storage errors can be classified as a disk in a set of "first-level" redundant disks to be used with priority, and the first disk having experienced a data storage error can be used as a disk in a set of "second-level" redundant disks. Only after all the first-level redundant disks are used, are the second-level redundant disks considered to be used for backup. The second-level redundant disks are only used under certain conditions, so as to ensure the reliability of the RAID data storage system. Therefore, in some embodiments, FIG. 2 also includes operation S205, where, in response to the presence of a first-level redundant disk within the RAID data storage system, the first-level redundant disk is used to rebuild data to replace the first disk. The techniques of data rebuilding within the RAID data storage system are well-known to those of skill in the art, and will not be described herein.

In some embodiments, designating the first disk as a second-level redundant disk within the RAID data storage system in operation S203 also includes (not shown in FIG. 2), storing the count of data storage errors experienced by the first disk before it is designated as the second-level redundant disk. The first disk may have experienced media errors or slow disk errors, which may have occurred multiple times. An error condition causing the disk to be isolated would be generated only the number of times of the data storage error occurs exceeds a defined threshold count. If such a disk is to be reused, it may be necessary to record the count of data storage errors experienced so as to determine whether it is suitable to use the reused disk as a redundant disk.

In some embodiments, FIG. 2 also includes an operation S201 (not shown in FIG. 2) which includes isolating the first disk in response to the first disk experiencing a data storage error and determining that the first disk has experienced a hard error.

In some embodiments, FIG. 2 also includes an operation S204 (not shown in FIG. 2) which includes isolating the first disk in response to the validating operation on the first disk fails.

Figure 3:
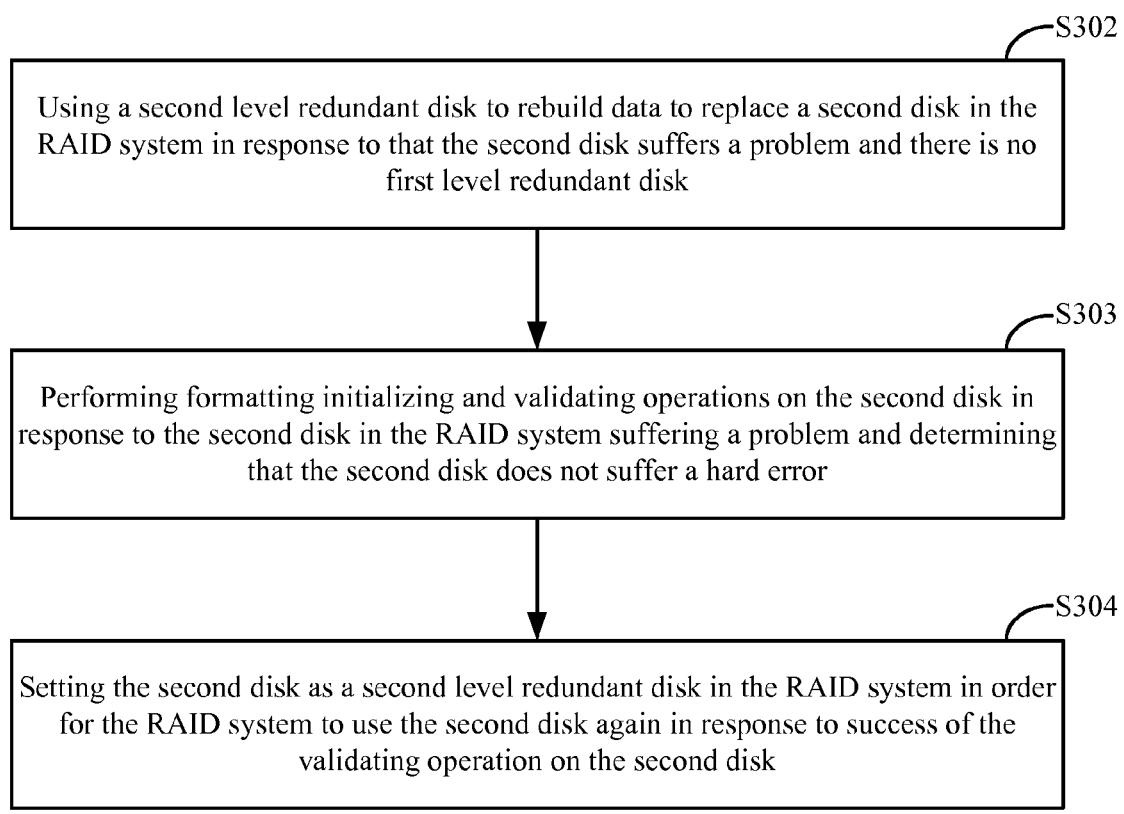
FIG. 3 is a flowchart depicting a method for reuse of a second-level redundant disk.

The method in FIG. 2 includes preparing a second-level redundant disk within the RAID data storage system for the RAID system to reuse, and FIG. 3 is a method flowchart illustrating how to reuse a second-level redundant disk. According to FIG. 3, an operation S302, a second-level redundant disk can be used to rebuild data to replace a second disk within the RAID data storage system in response to the second disk experiencing a data storage error when there is no first-level redundant disk. That is, in this method, it is considered that, after validation, the second-level redundant disk generally has higher reliability than the disk currently experiencing a data storage error, and therefore can be selected to replace the problematic disk. In addition, a second-level redundant disk can be a second-level redundant disk which is the first disk, after validation, or may be another second-level redundant disk in the existing set of second-level redundant disks.

Some embodiments of the method shown in FIG. 3 may also include operation S303 including performing formatting, initializing and validating operations on the second disk in response to the second disk within the RAID data storage system experiencing a data storage error and subsequently determining that the second disk has not experienced a hard error. Operation S304 includes designating the second disk as a second-level redundant disk within the RAID system in order for the RAID system to use the second disk again in response to success of the validating operation on the second disk. Particular embodiments can also include operation S305 (not shown in FIG. 3) including isolating the second disk in response to failure of the validating operation on the second disk.

Some embodiments of the method shown in FIG. 3 can also include operation S301 (not shown in FIG. 3) including isolating the second disk in response to the second disk experiencing a data storage error and subsequently determining that the second disk has experienced a hard error.

In an embodiment of the method shown in FIG. 3, the method may also include operation S306 (not shown in FIG. 3) including, in response to a new first-level redundant disk within the RAID system and a third disk rebuilt from the second-level redundant disk within the RAID system, using the new first-level redundant disk to rebuild data to replace the third disk. In other words, if there is a more reliable first-level disk, the first-level redundant disk would be used with a higher priority. A second-level redundant disk is always used only after the first-level redundant disks are used up. In addition, even if a supply of second-level redundant disks have been used, as long as any first-level redundant disk is released, a supply of released first-level redundant disks would be used to replace the second-level redundant disk, thereby improving the reliability of the RAID data storage system.

Figure 4:
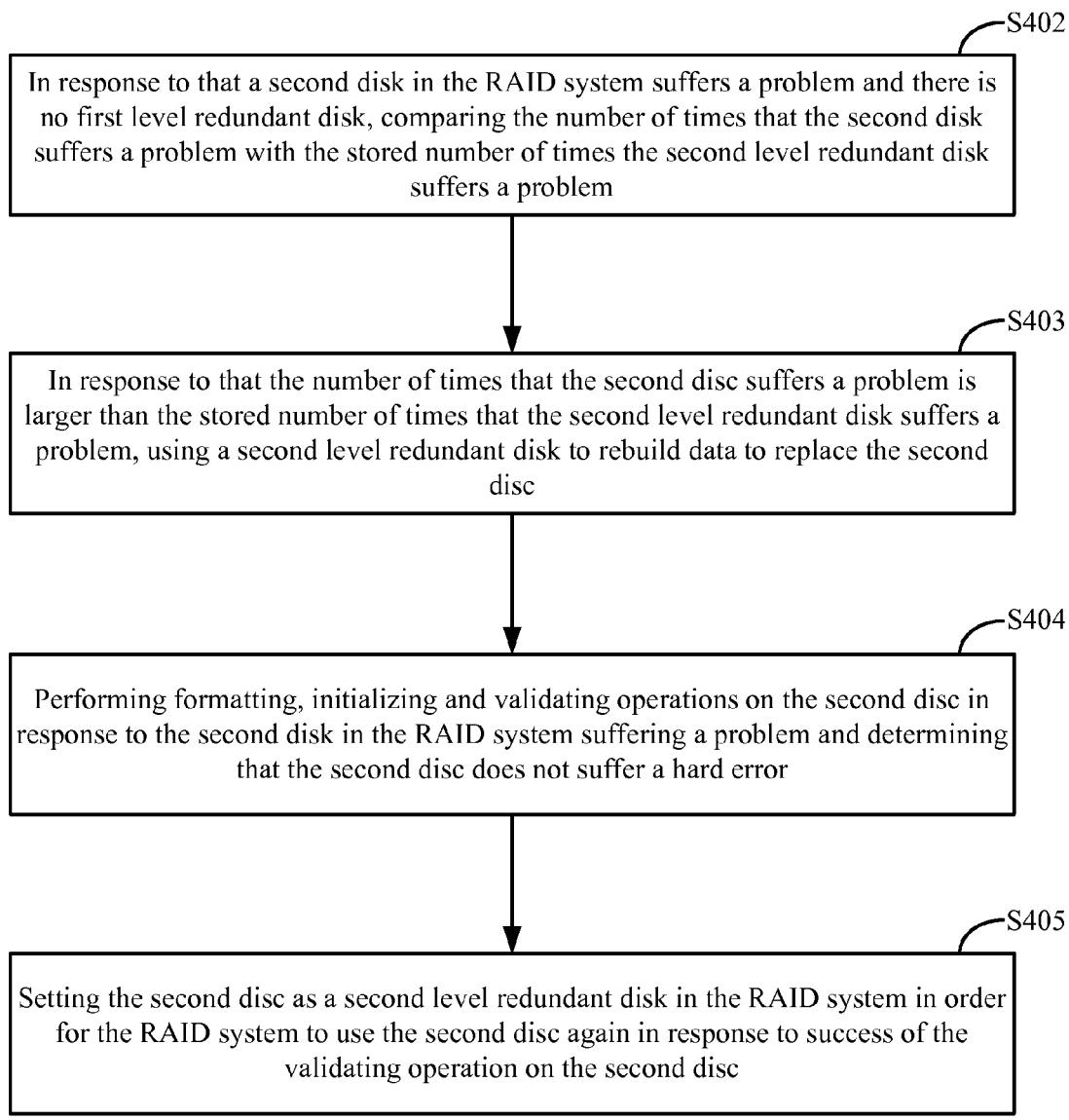
FIG. 4 is a flowchart depicting a method for reuse of a second-level redundant disk.

FIG. 4 is another method flowchart that depicts how to reuse a second-level redundant disk. According to FIG. 4, at operation S402, in response to a second disk within the RAID system experiencing a data storage error when there is no available first-level redundant disk in the system, the count of data storage errors experienced by the second disk is compared with the stored count of data storage errors experienced by the second-level redundant disk. At operation S403, in response to the count of data storage errors experienced by the second disk being greater than the stored count of data storage errors experienced by the second-level redundant disk, the second-level redundant disk can be used to rebuild data to replace the second disk. At this operation, it is not considered that the second-level redundant disk, after validation, generally has higher reliability than the disk currently experiencing a data storage error. However, the reliability can be determined by comparing the previous counts of data storage errors experienced by the two disks. The disk that experiences fewer data storage errors may generally have higher reliability. In this case, if the stored counts of data storage errors experienced by the second-level redundant disk is larger, it is not generally reliable to use it as the working disk to rebuild data. At this operation, even if there is no first-level redundant disk to be used, the second-level redundant disk would not be used, but instead, a delayed disk process may be marked to wait for a suitable redundant disk to perform the process.

In addition, an embodiment of the method shown in FIG. 4 also includes operation S404, which includes performing formatting, initializing and validating operations on the second disk in response to the second disk within the RAID system experiencing a data storage error and determining that the second disk has not experienced a hard error. Operation S405 includes designating the second disk as a second-level redundant disk within the RAID system in order for the RAID system to use the second disk again in response to success of the validating operation on the second disk. A further embodiment also includes an operation S406 (not shown in FIG. 4) of isolating the second disk in response to failure of the validating operation on the second disk.

In an embodiment of the method shown in FIG. 4, the method also includes an operation S401 (not shown in FIG. 4) which includes isolating the second disk in response to the second disk experiencing a data storage error and subsequently determining that the second disk experiences a hard error.

In an embodiment of the method shown in FIG. 4, the method also includes an operation S407 (not shown in FIG. 4) of, in response to a new first-level redundant disk added within the RAID system, and a third disk rebuilt from the second-level redundant disk within the RAID system, using the new first-level redundant disk to rebuild data to replace the third disk.

Figure 5:
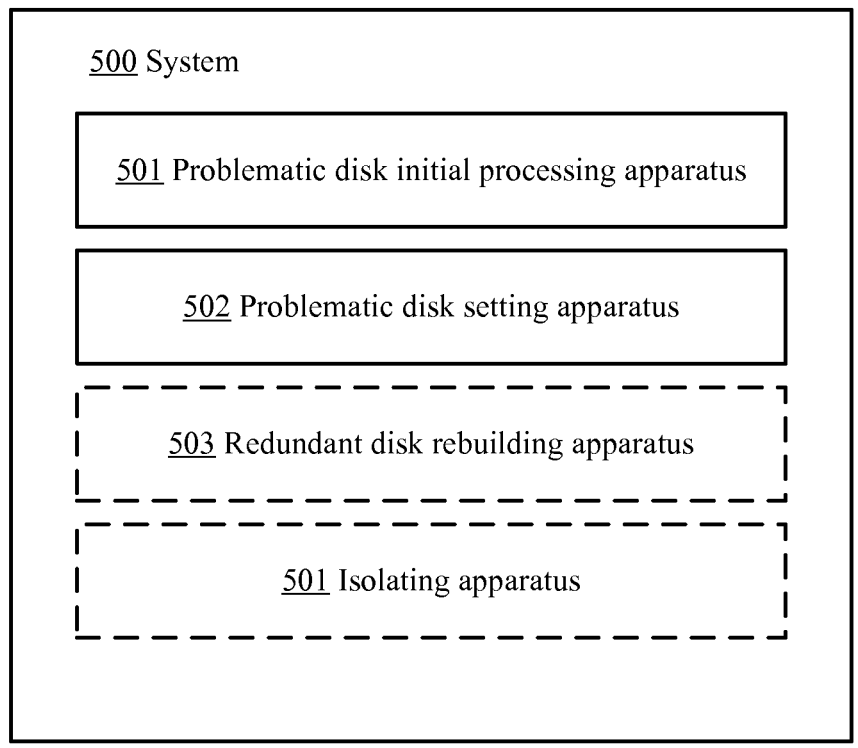
FIG. 5 depicts a block diagram of a system for reuse of a problematic disk within a RAID data storage system.

With the same inventive concept, the present disclosure also discloses a system for reuse of a problematic disk within a RAID system. FIG. 5 shows a structural block diagram of the system for reuse 500 of a problematic disk within a RAID system. According to FIG. 5, the system 500 includes a problematic disk initial processing apparatus 501, configured to perform formatting, initializing and validating operations on a first disk within the RAID system in response to the first disk experiencing a data storage error and determining that the first disk has not experienced a hard error. A problematic disk designating apparatus 502 is configured to designate the first disk as a second-level redundant disk within the RAID system in order for the RAID system to use the first disk again in response to success of the validating operation on the first disk.

In some embodiments, the problematic disk designating apparatus 502 is further configured to store the count of data storage errors experienced by the first disk before it is designated as the second-level redundant disk. In some embodiments, the problematic disk designating apparatus 502 is further configured to use a second-level redundant disk to rebuild data to replace a second disk within the RAID system in response to the second disk experiencing a data storage error when the system lacks an available first-level redundant disk. In particular embodiments, the problematic disk designating apparatus 502 is further configured to, in response to a second disk within the RAID system experiences a data storage error and when the system lacks an available first-level redundant disk, compare the data storage error count of the second disk with the stored data storage error count of the second-level redundant disk. The problematic disk designating apparatus 502 may also be configured to, in response to the data storage error count of the second disk exceeding the stored data storage error count of the second-level redundant disk, use a second-level redundant disk to rebuild data to replace the second disk.

In some embodiments, the problematic disk initial processing apparatus 501 can be further configured to perform formatting, initializing and validating operations on the second disk in response to the second disk within the RAID system experiencing a data storage error.

In some embodiments, the problematic disk designating apparatus 502 is further configured to designate the second disk as a second-level redundant disk within the RAID data storage system in order for the RAID system to use the second disk again in response to success of the validating operation on the second disk.

In some embodiments, the system 500 also includes a redundant disk rebuilding apparatus 503 configured to, in response to the availability of a first-level redundant disk within the RAID system, use the first-level redundant disk to rebuild data to replace the first disk. In some embodiments, the redundant disk rebuilding apparatus 503 is further configured to, in response to a new first-level redundant disk built within the RAID system and a third disk rebuilt from the second-level redundant disk within the RAID system, use the new first-level redundant disk to rebuild data to replace the third disk.

In some embodiments, the system 500 can include an isolating apparatus 504 configured to isolate the second disk in response to the validating operation on the second disk fails. In some embodiments, the isolating apparatus 504 is configured to isolate the second disk in response to the second disk experiencing a data storage error and determining that the second disk has experienced a hard error.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for reuse of a problematic disk in a Redundant Array of Independent Disks (RAID) system, the method comprising:
    performing formatting, initializing and validating operations on a first disk in the RAID system in response to the first disk experiencing a problem and determining that the first disk has not experienced a hard error; and
    setting the first disk as a second-level redundant disk in the RAID system in order for the RAID system to use the first disk again in response to success of the validating operation on the first disk.

2. The method of claim 1, further comprising rebuilding, on a first-level redundant disk within the RAID data storage system, data to replace the contents of the first disk.

3. The method of claim 1, wherein setting the first disk as a second-level redundant disk in the RAID system further comprises storing the number of times that the first disk experiences a problem before it is set as the second-level redundant disk.

4. The method of claim 3, wherein using the first disk again further comprises:
    comparing, in response to a second disk within the RAID system experiencing a data storage error and the RAID system lacking an available first-level redundant disk, a count of data storage errors experienced by the second disk with a stored count of data storage errors experienced by the second-level redundant disk; and
    in response to the count being greater than the stored count, rebuilding on the second-level redundant disk, data to replace the second disk.

5. The method of claim 1, wherein using the first disk again further comprises rebuilding, in response to a second disk experiencing a data storage error and the RAID system lacking an available a first-level redundant disk, on a second-level redundant disk, data to replace the second disk within the RAID system.

6. The method of claim 5, further comprising performing, in response to the second disk within the RAID system experiencing a recoverable data storage error, formatting, initializing and validating operations on the second disk.

7. The method of claim 6, further comprising designating the second disk as a second-level redundant disk within the RAID system; and in response to success of the validating operation on the second disk, accessing the second disk.

8. The method of claim 6, further comprising, in response to a failure of the validating operation on the second disk, isolating the second disk from the RAID system.

9. The method of claim 5, further comprising isolating, in response to the second disk experiencing a hard data storage error, the second disk from the RAID system.

10. A system for reuse of a problematic disk within a Redundant Array of Independent Disks (RAID), the system including a non-transitory computer-readable storage medium having program instructions stored thereon, the program instructions executable by one or more computer processor circuits configured to execute a method, the method comprising:

performing formatting, initializing and validating operations on a first disk in the RAID system in response to the first disk experiencing a problem and determining that the first disk has not experienced a hard error; and setting the first disk as a second-level redundant disk in the RAID system in order for the RAID system to use the first disk again in response to success of the validating operation on the first disk.

11. The system of claim 10, the method further comprising rebuilding, on a first-level redundant disk within the RAID data storage system, data to replace the contents of the first disk.

12. The system of claim 10, wherein setting the first disk as a second-level redundant disk in the RAID system further comprises storing the number of times that the first disk experiences a problem before it is set as the second-level redundant disk.

13. The system of claim 12, wherein using the first disk again further comprises:

comparing, in response to a second disk within the RAID system experiencing a data storage error and the RAID system lacking an available first-level redundant disk, a count of data storage errors experienced by the second disk with a stored count of data storage errors experienced by the second-level redundant disk; and in response to the count being greater than the stored count, rebuilding on the second-level redundant disk, data to replace the second disk.

14. The system of claim 10, wherein using the first disk again further comprises rebuilding, in response to a second disk experiencing a data storage error and the RAID system lacking an available a first-level redundant disk, on a second-level redundant disk, data to replace the second disk within the RAID system.

15. The system of claim 14, the method further comprising performing, in response to the second disk within the RAID system experiencing a recoverable data storage error, formatting, initializing and validating operations on the second disk.

16. The system of claim 15, the method further comprising designating the second disk as a second-level redundant disk within the RAID system; and in response to success of the validating operation on the second disk, accessing the second disk.

17. The system of claim 15, the method further comprising, in response to a failure of the validating operation on the second disk, isolating the second disk from the RAID system.

18. The system of claim 14, the method further comprising isolating, in response to the second disk experiencing a hard data storage error, the second disk from the RAID system.

* * * * *